United States Patent [19]

Lasater et al.

[11] 4,103,938
[45] Aug. 1, 1978

[54] SWIVEL CONNECTOR

[75] Inventors: Donald A. Lasater, Fairfield; Steven R. Ebbesmeyer, Middletown, both of Ohio

[73] Assignee: Dover Corporation, New York, N.Y.

[21] Appl. No.: 713,257

[22] Filed: Aug. 10, 1976

[51] Int. Cl.² ............................................. F16L 39/00
[52] U.S. Cl. ................................. 285/136; 285/168; 285/178; 285/276; 285/404
[58] Field of Search ............... 285/134, 136, 168, 276, 285/272, 282, 25, 26, 28, 29, 353, 356, 404, 178; 141/387; 403/362

[56] References Cited

U.S. PATENT DOCUMENTS

| 991,501 | 5/1911 | Graves | 285/168 |
| 1,995,420 | 3/1935 | Fischer | 287/109 |
| 2,587,170 | 2/1952 | Klingler | 285/279 |
| 2,745,682 | 5/1956 | Chevallier | 285/168 |
| 2,834,465 | 5/1958 | McMichael | 285/134 |
| 2,871,032 | 1/1959 | Woodling | 285/178 |
| 3,990,731 | 11/1976 | Schnipke | 285/168 |

Primary Examiner—Reinaldo P. Machado
Attorney, Agent, or Firm—John G. Schenk

[57] ABSTRACT

A swivel connector comprises three hollow members with the first and second members rotatably connected to each other for rotation about a first axis and the second and third members rotatably connected to each other for rotation about a second axis at an angle to the first axis. The first member has adjustable members for connection to the gasoline supply and vapor return passages of a gasoline dispensing nozzle body. The third member has the gasoline supply and vapor return hoses, which are connected to the pump pedestal, connected thereto. A hollow tubular member is supported in the first and third members and extends through the second member to provide the passage for the gasoline supply within the swivel connector while the space between the inner walls of the first, second, and third members and the outer surface of the hollow tubular member provides the vapor return passage within the swivel connector.

28 Claims, 10 Drawing Figures

SWIVEL CONNECTOR

When filling a vehicle tank with gasoline through a dispensing nozzle, various types of means have been suggested for sealing the fill pipe opening in which the spout of the nozzle is inserted to prevent pollution of the atmosphere by the vapors from the gasoline within the tank. In one of these arrangements, the nozzle body has both the gasoline supply passage and vapor return passage mounted therein with each connected to a separate hose. One of the hoses communicates with the gasoline supply tank while the other hose, which is a vapor return hose, is connected with vapor recovery equipment.

The connection of the two hoses directly to the nozzle body has created the problem of the hoses tending to become twisted so as to have substantial tension thereon. This is because of the various locations of the fill pipes in various vehicles to be filled and the location of the vehicle, relative to the pump pedestal, when it is being filled. This results in two 90° bends in each of the hoses.

As a result of this tension in each of the hoses, the seal, which is provided by the end of a bellows around the spout of the nozzle, for example, may not always be effective. The tension in each of the hoses also may make it more difficult to lock the spout of the nozzle within the fill pipe opening.

Furthermore, this twisting of the hoses tends to make them wear because of the forces to which they are subjected. As a result, the life of each of the hoses, when used in a pair, may not be as long as a single hose for a gasoline dispensing nozzle having no vapor return hose.

The present invention satisfactorily solves the foregoing problems through providing a swivel connector between the pair of hoses and the nozzle body passages with which the hoses are to communicate. The swivel connector eliminates the twisting of the hoses because of rotation of a first member to which the nozzle body is connected being about a different axis than rotation of another member of the swivel connector to which the hoses are connected. However, the hoses are connected to the swivel connector along axes substantially parallel to the axes along which the passages of the nozzle body are connected.

At the same time, the swivel connector of the present invention provides electrical continuity throughout the swivel connector. This prevents the possibility of any spark being created.

An object of this invention is to provide a unique swivel connector.

Another object of this invention is to provide a swivel connector between a gasoline dispensing nozzle body and gasoline supply and vapor return hoses.

Other objects, uses, and advantages of this invention are apparent upon a reading of this description, which proceeds with reference to the drawings forming part thereof and wherein.

Figure 1:
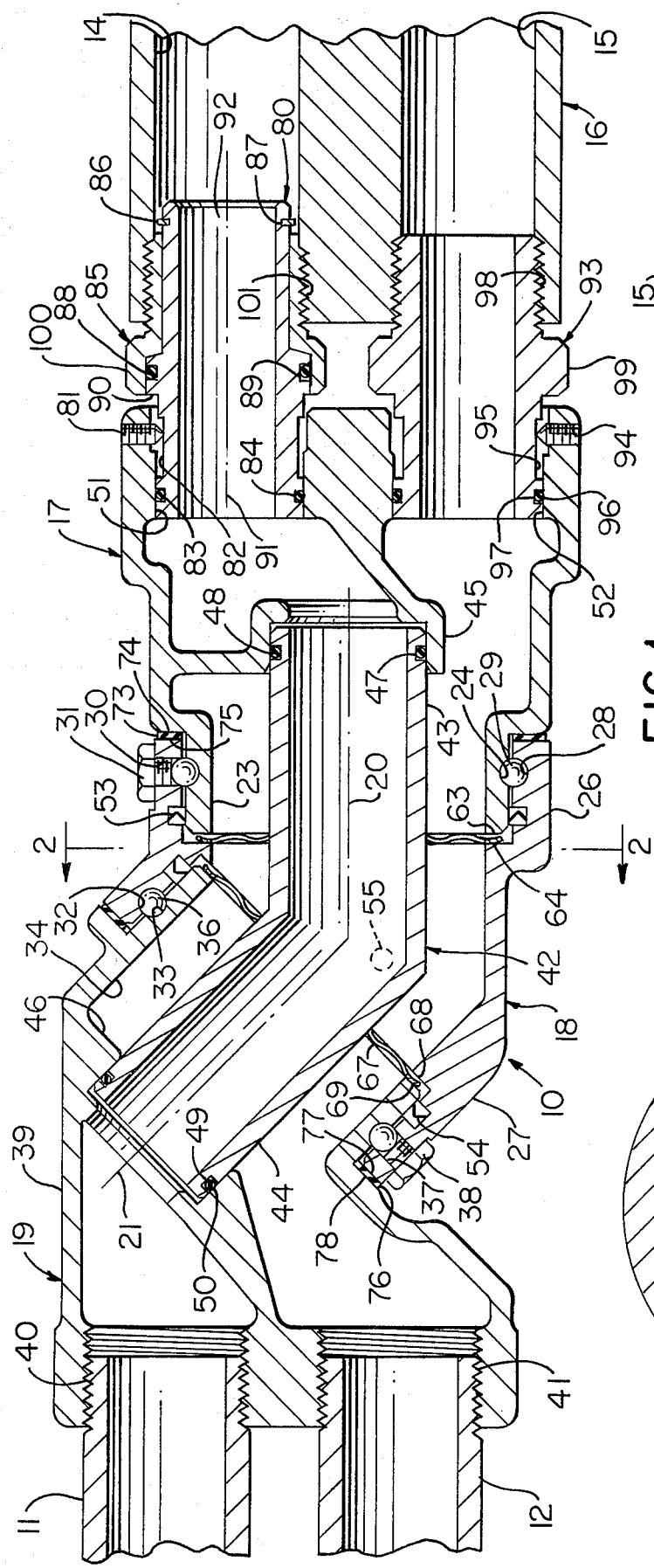
FIG. 1 is a longitudinal sectional view of one form of the swivel connector of the present invention.

Referring to the drawings and particularly FIG. 1, there is shown a swivel connector 10 for connecting flexible hoses 11 and 12 to passage 14 and 15 in a liquid dispensing nozzle body 16. The hose 11 supplies a liquid such as gasoline, for example, through the swivel connector 10 to the passages 14 in the nozzle body 16. The passage 15 returns vapor from a vapor return passage in the nozzle body 16 through the swivel connector 10 to the hose 12, which is connected to vapor recovery equipment. The nozzle body 16 may be of the type shown and described in U.S. Pat. No. 3,866,636 to Lasater, for example.

The swivel connector 10 includes a first member 17, a second member 18, and third member 19. Each of the members 17, 18, and 19 is formed by a hollow body.

The first member 17 and the second member 18 are rotatably connected to each other for rotation about a first axis 20. The second member 18 and the third member 19 are rotatably connected to each other for rotation about a second axis 21, which is at an angle to the first axis 20.

The first member 17 has an annular portion 23 at one end. The annular portion 23 is formed with a semi-circular groove 24 extending around its periphery.

The second member 18 has a first portion 26 disposed in surrounding relation to the annular portion 23 of the first member 17. The second member 18 has a second portion 27 disposed at the same angle to the first portion 26 as the second axis 21 is disposed to the first axis 20.

The first portion 26 of the second member 18 has a semicircular groove 28 formed in its inner surface. The grooves 24 and 28 cooperate to form a race between the first member 17 and the second member 18 for a plurality of balls 29, which are disposed within the race to allow rotation between the first member 17 and the second member 18 about the first axis 20.

The balls 29 are preferably formed of a material which will cause the balls 29 to wear rather than the first member 17 or the second member 18. Accordingly, with the members 17, 18, and 19 formed of aluminum, for example, most of the balls 29 are formed of a suitable plastic such as Delrin, for example. However, because high temperatures from a fire, for example, would cause melting of a plastic whereby the members 17 and 18 would be disconnected since the balls 29 would no longer hold them together and permit gasoline to escape, some of the balls 29 are formed of steel. For example, thirty-seven of the balls 29 would be formed of plastic and six of the balls 29 would be formed of steel. The steel balls 29 are formed of a slightly smaller diameter than the plastic balls 29 so as to not create wear on either of the member 17 or the member 18 but still have a sufficient diameter to retain the members 17 and 18 connected to each other if the plastic balls 29 were to melt during a fire.

The balls 29 are deposited within the race through a threaded passage 30 in the first portion 26 of the second member 18. A plug 31 is threaded into the threaded passage 30 after the balls 29 have been deposited therein to retain the balls 29 within the race. With thirty-seven of the balls 29 being formed of plastic and six of the balls 29 being formed of steel, there would be five groups of six of the plastic balls 29 and one group of seven of the plastic balls 29 with each of the steel balls 29 being disposed between adjacent groups of the plastic balls 29. The size of the balls 29 determines the total number of the balls 29 and the number of the balls 29 in each of the groups of the balls 29.

The second portion 27 of the second member 18 has a semicircular groove 32 for cooperation with a semicircular groove 33 in a first portion 34 of the third member 19. The grooves 32 and 33 cooperate to form a race for a plurality of balls 36 so that the second member 18 and the third member 19 are rotatably connected for rotation about the second axis 21.

The balls 36 are formed in the same manner as the balls 29. The balls 36 are deposited within the race through a threaded passage 37 in the second portion 27 of the second member 18. A plug 38 is threaded into the threaded passage 37 to retain the balls 36 within the race.

The third member 19 has a second portion 39 disposed at an angle to the first portion 34 so that threaded passages 40 and 41 in the third member 19 have their centerline parallel to the first axis 20 as seen in FIG. 1. The threaded passage 40 has the hose 11 connected thereto while the threaded passage 41 has the hose 12 connected thereto. Thus, liquid enters the third member 19 through the threaded passage 40 while vapor leaves the third member 19 through the threaded passage 41.

A hollow tubular member 42, which is preferably formed of a suitable plastic such as Delrin, has a first portion 43 and a second portion 44 at an angle to the first portion 43. The angle between the first portion 43 and the second portion 44 is the same as the angle between the axis 20 and 21. Accordingly, the first portion 43 has its free end supported within a bearing portion 45 of the first member 17 so that its centerline is aligned with the axis 20 while the second portion 44 has its free end supported within a bearing portion 46 of the third member 19 so that its centerline is aligned with the axis 21.

The first portion 43 of the hollow tubular member 42 has a groove 47 in its outer surface adjacent its free end to receive an O-ring 48 for sealing engagement with the inner surface of the bearing portion 45. The free end of the second portion 44 of the hollow tubular member 42 has a groove 49 in its outer surface to receive an O-ring 50 for sealing engagement with the inner surface of the bearing portion 46.

The hollow tubular member 42 provides communication from the threaded passage 40 in the third member 19 to a passage 51 in the first member 17. This enables liquid to flow from the hose 11 to the passage 14 in the nozzle body 16.

As a result of the disposition of the hollow tubular member 42 with the members 17, 18, and 19, a vapor return passage to the hose 12 is formed between the inner walls of the members 17, 18, and 19 and the outer surface of the hollow tubular member 42. The first member 17 has a passage 52 communicating with the vapor return passage 15 in the nozzle body 16.

To prevent leakage of vapor between the first member 17 and the second member 18, a lip seal 53 is disposed in a groove in the inner surface of the first portion 26 of the second member 18 for cooperation with the outer surface of the annular portion 23 of the first member 17. Similarly, to prevent vapor leakage between the second member 18 and the third member 19, a lip seal 54 is disposed in a groove in the inner surface of the second portion 27 of the second member 18 for cooperation with the outer surface of the first portion 34 of the third member 19. It should be understood that any other type of suitable sealing arrangement could be employed instead of the lip seals 53 and 54.

Figure 2:
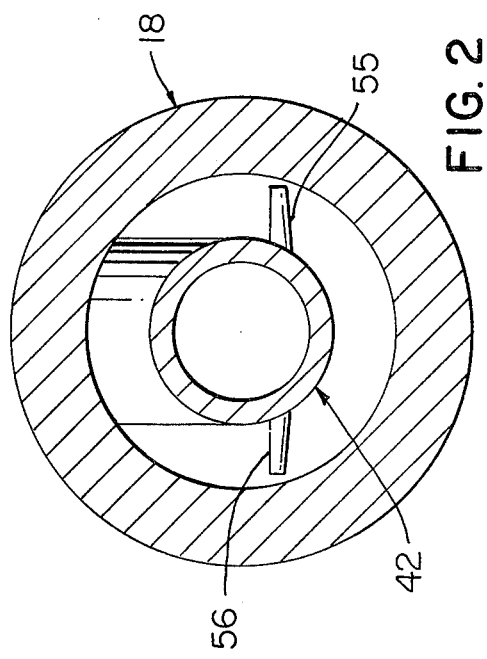
FIG. 2 is a sectional view of the swivel connector of FIG. 1 and taken along line 2—2 of FIG. 1.

The hollow tubular member 42 has a pair of extensions 55 and 56 extending from opposite sides thereof as shown in FIG. 2. The extensions 55 and 56 are disposed adjacent the intersection of the first portion 43 and the second portion 44 of the hollow tubular member 42 as shown in FIG. 1.

As shown in FIG. 2, the extensions 55 and 56 are spaced a very small distance from the inner wall of the second member 18 so that any tendency of the hollow tubular member 42 to wobble when there is rotation between the members 17 and 18 about the axis 20 or the members 18 and 19 about the axis 21 is prevented. This prevents the binding of the free end of the first portion 43 of the hollow tubular member 42 in the bearing portion 45 and the binding of the free end of the second portion 44 of the hollow tubular member 42 in the bearing portion 46.

Figure 3:
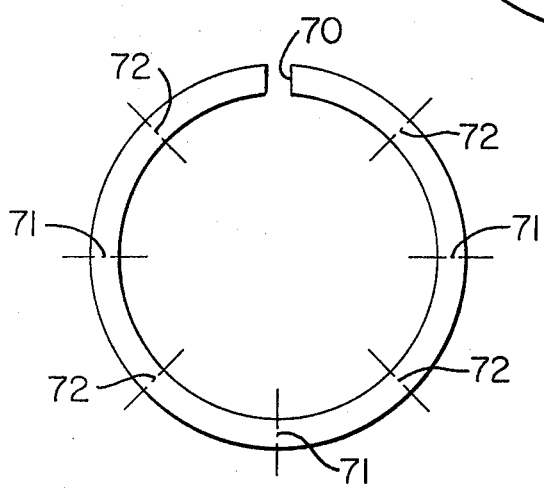
FIG. 3 is a front elevational view of a washer utilized to provide electrical continuity in the swivel connector of FIG. 1.
Figure 4:
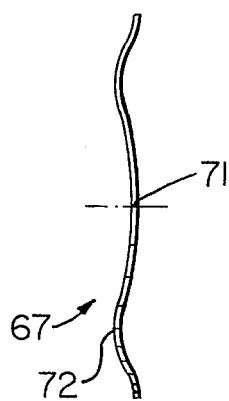
FIG. 4 is a side elevational view of the washer of FIG. 3.

A wavy washer 67 is provided between an end surface 68 of the second member 18 and an end surface 69 of the third member 19 to provide electrical continuity therebetween. As shown in FIGS. 3 and 4, the washer 67 has a slot 70 therein at one of its low portions 71. The washer 67 has four of the low portions 71 disposed 90° from each other with one located at the slot 70 and four high portions 72 disposed 90° from each other and 45° from each of the adjacent low portions 71.

When the washer 67 is disposed between the end surface 68 of the second member 18 and the end surface 69 of the third member 19, the low portions 71 of the washer 67 will contact one of the two end surfaces 68 and 69 while the high portions 72 of the washer 67 will contact the other of the end surfaces 68 and 69. The slot 70 prevents any load from being transmitted by the washer 67 to either of the members 18 and 19.

One of the wavy washers 67 also is provided between an end surface 63 of the first member 17 and an end surface 64 of the second member 18 to provide electrical continuity therebetween in the same manner as the wavy washer 67 provides electrical continuity between the end surface 68 of the second member 18 and the end surface 69 of the third member 19. Instead of using the wavy washers 67, a plain washer with a bow in the middle also could be employed since the bow insures that there is electrical contact between the two adjacent members 17 and 18 or 18 and 19.

A thrust washer 73 (see FIG. 1), which is plastic, is disposed between an end surface 74 of the first member 17 and an end surface 75 of the second member 18 to prevent the end surfaces 74 and 75 from contacting each other to reduce wear. A thrust washer 76, which is plastic, is disposed between an end surface 77 of the second member 18 and an end surface 78 of the third member 19 to prevent contact between the end surfaces 77 and 78 to reduce wear.

The passage 51 in the first member 17 has an adjusting rod 80 disposed therein. The adjusting rod 80 is retained in the passage 51 by a set screw 81 being disposed within a groove 82 in the outer surface of the adjusting rod 80. This arrangement enables both longitudinal adjustment of the adjusting rod 80 relative to the first member 17 and rotation of the adjusting rod 80 relative to the first member 17.

An O-ring 83, which is mounted in a groove 84 in the outer surface of the adjusting rod 80, forms a seal with the wall of the passage 51. Thus, liquid cannot escape therebetween.

An adaptor 85 is slidably mounted on the adjusting rod 80 for rotation relative thereto. The adaptor 85 is held on the adjusting rod 80, prior to assembly with the nozzle body 16, by a retaining ring 86, which is disposed in a groove 87 in the outer surface of the adjusting rod 80.

The adjusting rod 80 has an O-ring 88 mounted in a groove 89 in its outer surface to form a seal between the adjusting rod 80 and the inner surface of the adaptor 85. Thus, when the adaptor 85 is threaded in the passage 14 in the nozzle body 16, there can be no escape of liquid between the inner surface of the adaptor 85 and the outer surface of the adjusting rod 80.

The adjusting rod 80 is formed with its portion to the left (as viewed in FIG. 1) of an annular flat surface 90 concentric to a centerline 91 and its portion to the right (as viewed in FIG. 1) of the surface 90 concentric to a centerline 92. Thus, the adaptor 85 is concentric to the centerline 92. The centerlines 91 and 92 are spaced 0.032 inch from each other.

The passage 52 has an adjusting adaptor 93 disposed therein. The adjusting adaptor 93 is retained within the passage 52 in the first member 17 by a set screw 94 being disposed in a groove 95 in the outer surface of the adjusting adaptor 93. This arrangement enables longitudinal adjustment of the position of the adjusting adaptor 93 within the passage 52 relative to the first member 17. It also permits rotation of the adjusting adaptor 93 relative to the first member 17.

The adjusting adaptor 93 has an O-ring 96 disposed in a groove 97 in the outer surface thereof. The O-ring 96 forms a seal with the wall of the passage 52 to prevent leakage of vapor therebetween when the adjusting adaptor 93 is threaded in the passage 15 in the nozzle body 16.

The adjusting adaptor 93 has threads 98 thereon for cooperation with threads in the vapor passage 15 in the nozzle body 16. The adjusting adaptor 93 has flat surfaces 99 formed thereon to receive a wrench for rotating the adjusting adaptor 93. Likewise, the adaptor 85 has flat surfaces 100 thereon to receive a wrench and threads 101 for cooperation with threads in the passage 14 in the nozzle body 16.

The adjusting adaptor 93 provides electrical continuity between the swivel connector 10 and the nozzle body 16. This is accomplished through the set screw 94 being embedded in the adjusting adaptor 93 and in contact with the first member 17 because of threaded engagement therewith.

When the connector 10 is shipped for assembly, it has the adjusting rod 80 and the adaptor 93 retained in the passages 51 and 52, respectively, by the set screws 81 and 94, respectively. However, the adjusting rod 80 can both rotate and be moved longitudinally relative to the first member 17 within the limits of the length of the groove 82. Likewise, the adjusting adaptor 93 can both rotate and be moved longitudinally relative to the first member 17 within the limits of the length of the groove 95.

To obtain proper alignment with the passages 14 and 15 in the nozzle body 16, the adjusting rod 80 is rotated about the centerline 91 until the adaptor 85 is aligned with the liquid passage 14 in the nozzle body 16. This is when the centerline 92 is aligned with the centerline of the passage 14. Because the rotation of the adjusting rod 80 is about the centerline 91 rather than the centerline 92, this rotation of the adjusting rod 80 enables the centerline 92 to rotate about the centerline 91 to provide the desired alignment. The longitudinal adjustment of the adjusting rod 80 relative to the first member 17 was made prior to the rotation thereof.

Rotation of the adjusting rod 80 about the centerline 91 not only aligns the adaptor 85 with the passage 14 in the nozzle body 16 but also aligns the adjusting adaptor 93 with the passage 15 in the nozzle body 16. With the adaptor 85 aligned with the passage 14 in the nozzle body 16, the adjusting adaptor 93 is then threaded partially into the passage 15 in the nozzle body 16 through rotating the adjusting adaptor 93.

After the initial threading of the adjusting adaptor 93 into the passage 15 in the nozzle body 16, there is rotation of the adjusting adaptor 85 into the passage 14 in the nozzle body 16 for a few turns. Each of the adjusting adaptor 93 and the adaptor 85 is then alternately turned by a wrench, which cooperates with the flat surfaces 99 on the adjusting adaptor 93 and the flat surfaces 100 on the adaptor 85, to advance the adjusting adaptor 93 into the passage 15 and the adaptor 85 into the passage 14. The threaded relations provide seals therebetween. Upon completion of rotation of the adjusting adaptor 93, it is locked in position within the passage 52 by the set screw 94 engaging in the groove 95 in the adjusting adaptor 93. Upon completion of rotation of the adaptor 85, the adjusting rod 80 is locked in position within the passage 51 by the set screw 81 engaging in the groove 82 in the adjusting rod 80.

With the nozzle body 16 connected to the first member 17 of the swivel connector 10 and the hoses 11 and 12 connected to the third member 19 of the swivel connector 10, the nozzle body 16 can rotate through 360° relative to the hoses 11 and 12 without any twisting of the hoses 11 and 12 because of the rotation of the first member 17 relative to the second member 18 about the first axis 20. Similarly, there can be rotation of the hoses 11 and 12 through 360° relative to the nozzle body 16. However, most of the rotation occurs by the nozzle body 16 rather than by the hoses 11 and 12 since the hoses 11 and 12 have their ends fixed to the pump pedestal.

Figure 5:
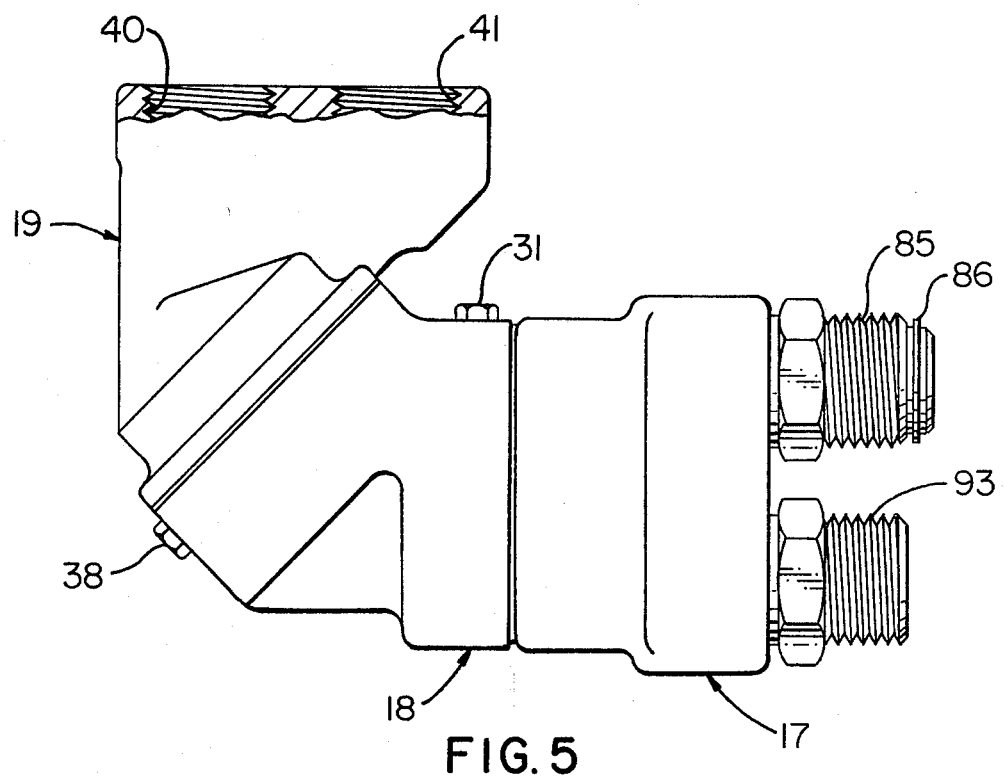
FIG. 5 is a side elevational view of the swivel connector of FIG. 1 without the hoses and the nozzle body and showing a third member of the swivel connector rotated 180° from a second member of the swivel connector so that the axes of the passages in a first member and the third member of the swivel connector are 90° to each other.
Figure 6:
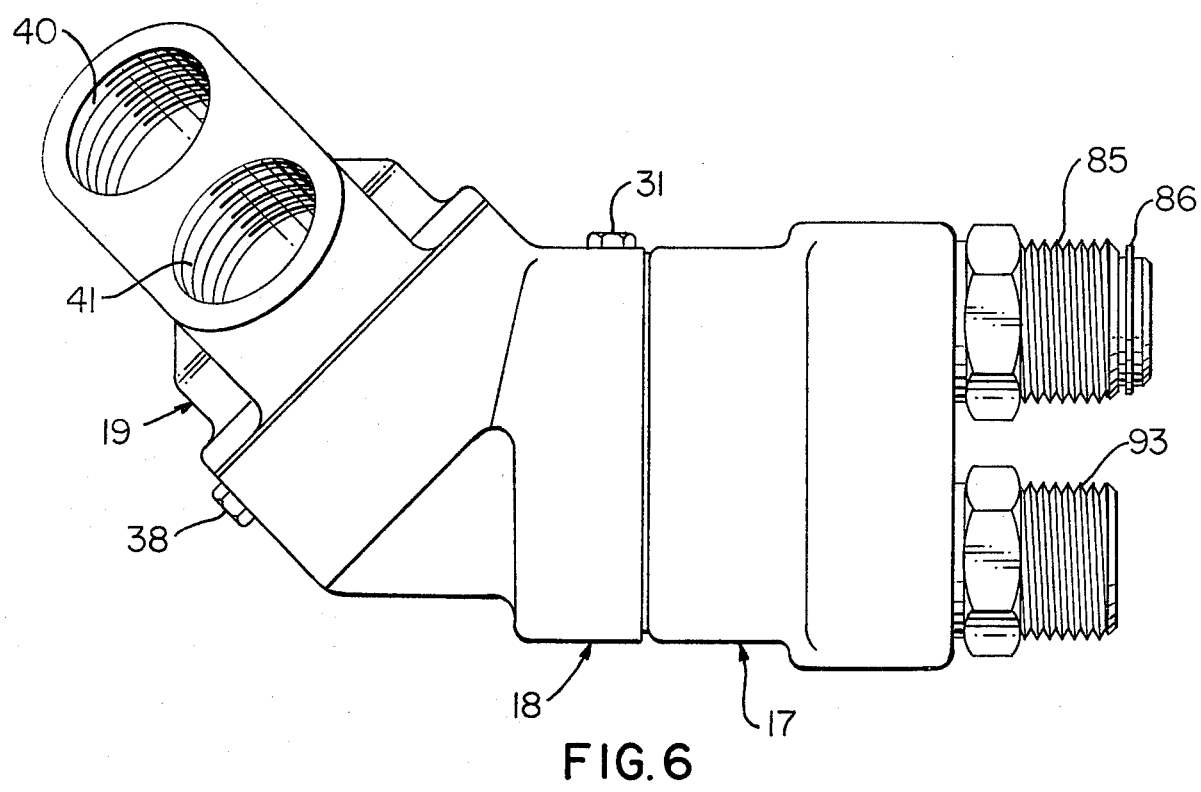
FIG. 6 is a side elevational view of the swivel connector of FIG. 1 without the hoses and the nozzle body and showing a third member of the swivel connector rotated 180° from a second member of the swivel connector so that the axes of the passages in the first and third members of the swivel connector are 45° to each other.

Referring to FIGS. 5 and 6, the relationship of the third member 19 to the second member 18 is different in each of these views than in FIG. 1. In FIG. 5, the third member 19 has been rotated 180° relative to the second member 18 about the second axis 21 so that the threaded passages 40 and 41, which have the hoses 11 and 12, respectively, connected thereto, are disposed at 90° to the passages 51 and 52, which have the nozzle body 16 connected thereto. This enables there to be a 90° change between the nozzle body 16 and the hoses 11 and 12 without producing any bend in the hoses 11 and 12. This significantly reduces the wear of the hoses 11 and 12.

In FIG. 6, the threaded passages 40 and 41 are at an angle of 45° to the passages 51 and 52. This occurs when there is 90° of relative rotation between the third member 19 and the second member 18 about the second axis 21.

While FIGS. 5 and 6 show two specific positions, it should be understood that the angle of the hoses 11 and 12 to the passages 14 and 15 of the nozzle body 16 can be any angle from 0°, as shown in FIG. 1, to 90°, as shown in FIG. 5. As a result, there is no bending of the hoses 11 and 12 when the nozzle body 16 is inserted in the fill pipe of the vehicle tank.

Figure 7:
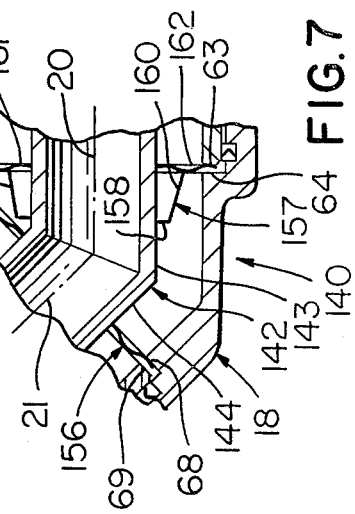
FIG. 7 is a fragmentary sectional view of a modification of the swivel connector of FIG. 1.

Referring to FIG. 7, there is shown a swivel connector 140 of the present invention in which the hollow tubular member 42 of the swivel connector 10 has been replaced by a hollow tubular member 142. The only difference of the hollow tubular member 142 from the hollow tubular member 42 is that the hollow tubular member 142 does not have the extensions 55 and 56 extending from opposite sides thereof to prevent any tendency of the hollow tubular member 142 to wobble when there is rotation between the members 17 and 18 about the first axis 20 or the members 18 and 19 about the second axis 21. The hollow tubular member 142 has a first portion 143 at an angle of 45° to a second portion 144.

The swivel connector 140 uses guides 156 and 157, which are separate from the hollow tubular member 142, to prevent wobble of the hollow tubular member 142 of the swivel connector 140. The guides 156 and 157 replace the wavy washers 67. The remainder of the swivel connector 140 is the same as the swivel connector 10.

Figure 8:
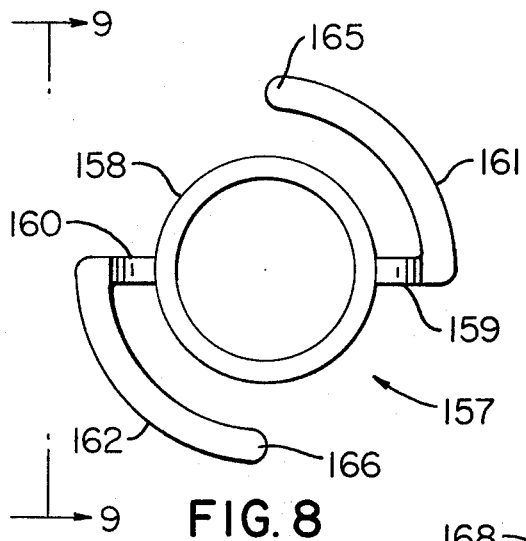
FIG. 8 is an end elevational view of one of the guides used in the swivel connector of FIG. 7.
Figure 9:
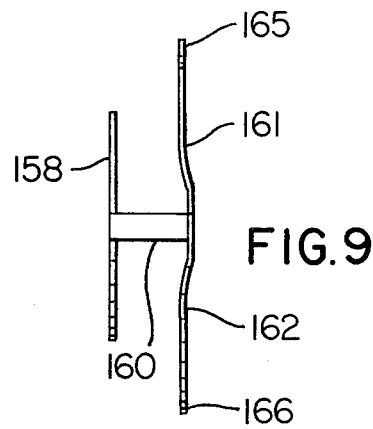
FIG. 9 is a side elevational view of the guide of FIG. 8 and taken along line 9—9 of FIG. 8.

The guide 157 (see FIGS. 8 and 9) includes an annular central portion 158, which fits around the first portion 143 of the hollow tubular member 142 in tight surrounding relation thereto. Arms 159 and 160 extend from diametrically disposed portions of the central portion 158 and at an angle to the central portion 158 as shown in FIG. 7.

The arms 159 and 160 have arcuate segments 161 and 162, respectively, extending therefrom for disposition between the end surface 63 of the first member 17 and the end surface 64 of the second member 18. The arcuate segments 161 and 162 are bowed to insure that there is contact between the end surface 63 of the first member 17 and the end surface 64 of the member 18 through ends 165 and 166 of the arcuate segments 161 and 162, respectively. Thus, the guide 157 not only aids in preventing wobble of the hollow tubular member 142 but also provides electrical continuity between the end surface 63 of the first member 17 and the end surface 64 of the second member 18.

Figure 10:
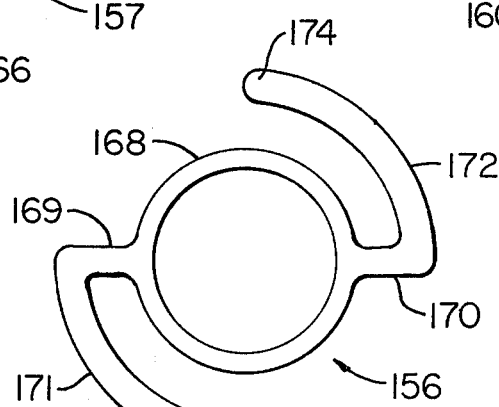
FIG. 10 is an end elevational view of the other guide used in the swivel connector of FIG. 7.

The guide 156 (see FIG. 10) includes an annular central portion 168, which fits around the second portion 144 of the hollow tubular member 142 in thigh surrounding relation thereto. Arms 169 and 170 extend from diametrically disposed portions of the central portion 168 and are disposed in the same plane as the central portion 168 as shown in FIG. 7.

The arms 169 and 170 have arcuate segments 171 and 172, respectively, extending therefrom for disposition between the end surface 68 of the second member 18 and the end surface 69 of the third member 19. The arcuate segments 171 and 172 are bowed to insure that there is contact between the end surface 68 of the second member 18 and the end surface 69 of the third member 19 through ends 173 and 174 of the arcuate segments 171 and 172, respectively. Thus, the guide 156 not only cooperates with the guide 157 to prevent wobble of the hollow tubular member 142 but also provides electrical continuity between the end surface 68 of the second member 18 and the end surface 69 of the third member 19.

It should be understood that the swivel connector 140 is similar in all other respects to the swivel connector 10. Thus, the swivel connector 140 functions in the same manner as the swivel connector 10 but utilizes a different arrangement to prevent wobble.

While the present invention has shown and described gasoline as being one of the fluids passing through the swivel connector 10 and gasoline vapor being the fluid flowing in the opposite direction to the swivel connector 10, it should be understood that the present invention is not limited to such. Thus, both fluids could flow in the same direction, for example. It also should be understood that both fluids could be liquids or vapors, for example.

An advantage of this invention is that the life of the hoses of a gasoline dispensing nozzle is increased. Another advantage of this invention is that it provides electrical continuity between all of the members of the swivel connector. A further advantage of this invention is that the removal of the tension in the hoses insures that there is no force from the hoses exerted on the nozzle body to render any vapor seal at the fill pipe opening ineffective.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A swivel connector adapted to connect a pair of flexible hoses or the like to a pair of passages or the like in a member to allow fluid flow between one of the hoses and one of the passages and fluid flow between the other of the hoses and the other of the passages including a first member having first means connected to one of the passages and second means connected to the other of the passages, a second member, means rotatably connecting said first and second members for relative rotation therebetween about a first axis so that either of said first and second members can rotate through 360° relative to the other of said first and second members about the first axis, a third member, means rotatably connecting said second and third members for relative rotation therebetween about a second axis at an angle to the first axis so that either of said second and third members can rotate through 360° relative to the other of said second and third members about the second axis, said third member having first means for connection to one of the hoses and second means for connection to the other of the hoses, said first member, said second member, and said third member having first passage means connecting said first means of said first member and said first means of said third member to allow fluid flow therebetween and second passage means connecting said second means of said first member and said second means of said third member to allow fluid flow therebetween.

2. The swivel connector according to claim 1 in which said first passage means includes a hollow tubular member extending from said first member through said second member to said third member, said hollow tubular member having one end supported by said first member and its other end supported by said third member, and said second passage means being formed between the outer surface of said hollow tubular member and the interior of said first member, said second member, and said third member.

3. The swivel connector according to claim 2 in which said first member includes a hollow body, said first means of said first member being adjustably supported in said body for axial and rotational motion relative thereto, and said second means of said first member being adjustably supported in said body for axial and rotational motion relative thereto.

4. The swivel conntector according to claim 3 including means to prevent wobble of said hollow tubular member when there is relative rotation between said first and second members about the first axis or relative rotation between said second and third members about the second axis.

5. The swivel connector according to claim 4 in which said wobble preventing means includes means extending from the outer surface of said hollow tubular member and disposed adjacent the inner wall of said second member.

6. The swivel connector according to claim 4 in which said wobble preventing means includes first guide means for engaging the outer surface of said hollow tubular member and disposed between abutting portions of said first and second members and second guide means engaging the outer surface of said hollow tubular member and disposed between abutting portions of said second and third members.

7. The swivel connector according to claim 4 in which said means rotatably connecting said first and second members includes a first arcuate groove in said first member to form a first portion of a race, a second arcuate groove in said second member to form the remaining portion of the race, and a plurality of balls disposed in the race formed between said first and second members; and said means rotatably connecting said second and third members includes a first arcuate groove in said third member to form a first portion of a race, a second arcuate groove in said second member to form the remaining portion of the race, and a plurality of balls disposed in the race formed between said second and third members.

8. The swivel connector according to claim 7 in which said body of said first member has a first passage, said first means of said first member is disposed in said first passage of said first member, said body of said first member has a second passage, and said second means of said first member is disposed in said second passage of said first member.

9. The swivel connector according to claim 8 in which said first means of said first member includes a first tubular member disposed in said first passage of said first member and rotatable about a first axis and a second tubular member slidably mounted on said first tubular member for rotation about a second axis offset with respect to the first axis, said second tubular member having means for connection to the one passage in the member, and means to connect said first tubular member to said first member, said connecting means allowing longitudinal and rotational adjustment of said first tubular member relative to said first member.

10. The swivel connector according to claim 9 including first means disposed within the interior of said first and second members and engaging each of said first and second members to provide electrical continuity between said first and second members and second means disposed within the interior of said second and third members and engaging each of said second and third members to provide electrical continuity between said second and third members.

11. The swivel connector according to claim 3 in which said body of said first member has a first passage, said first means of said first member is disposed in said first passage of said first member, said body of said first member has a second passage, and said second means of said first member is disposed in said second passage of said first member.

12. The swivel connector according to claim 11 in which said first means of said first member includes a first tubular member disposed in said first passage of said first member and rotatable about a first axis and a second tubular member slidably mounted on said first tubular member for rotation about a second axis offset with respect to the first axis, said second tubular member having means for connection to the one passage in the member, and means to connect said first tubular member to said first member, said connecting means allowing longitudinal and rotational adjustment of said first tubular member relative to said first member.

13. The swivel connector according to claim 2 including means to prevent wobble of said hollow tubular member when there is relative rotation between said first and second members about the first axis or relative rotation between said second and third members about the second axis.

14. The swivel connector according to claim 13 in which said wobble preventing means includes means extending from the outer surface of said hollow tubular member and disposed adjacent the inner wall of said second member.

15. A swivel connector adapted to connect a pair of flexible hoses or the like to a pair of passages or the like in a member to allow fluid flow between one of the hoses and one of the passages and fluid flow between the other of the hoses and the other of the passages including a first member having first means connected to one of the passages and second means connected to the other of the passages, a second member, means rotatably connecting said first and second members for relative rotation therebetween about a first axis, a third member, means rotatably connecting said second and third members for relative rotation therebetween about a second axis at an angle to the first axis, said third member having first means for connection to one of the hoses and second means for connection to the other of the hoses, said first member, said second member, and said third member having first passage means connecting said first means of said first member and said first means of said third member to allow fluid flow therebetween and second passage means connecting said second means of said first member and said second means of said third member to allow fluid flow therebetween, said first passage means including a hollow tubular member extending from said first member through said second member to said third member, said hollow tubular member having one end supported by said first member and its other end supported by said third member, and said second passage means being formed between the outer surface of said hollow tubular member and the interior of said first member, said second member, and said third member, means to prevent wobble of said hollow tubular member when there is relative rotation between said first and second members about the first axis or relative rotation between said second and third members about the second axis, said wobble preventing means including first guide means for engaging the outer surface of said hollow tubular member and disposed between abutting portions of said first and second members and second guide means engaging the outer surface of said hollow tubular member and disposed between abutting portions of said second and third members, 16. The swivel connector according to claim 15 in which said means rotatably connecting said first and second members includes a first arcuate groove in said first member to form a first portion of a race, a second arcuate groove in said second member to form the remaining portion of the race, and a plurality of balls disposed in the race formed between said first and second members; and said means rotatably connecting said second and third members includes a first arcuate groove in said third member to form a first portion of a race, a second arcuate groove in said second member to form the remaining portion of the race, and a plurality of balls disposed in the race formed between said second and third members.

17. The swivel connector according to claim 1 including first means disposed within the interior of said first and second members and engaging each of said first and second members to provide electrical continuity between said first and second members and second means disposed within the interior of said second and third members and engaging each of said second and third members to provide electrical continuity between said second and third members.

18. A hollow body having a pair of passages for connection to a pair of threaded passages in a member, first means disposed in one of said passages in said body to provide communication between the interior of said body and one of the passages in the member and second means slidably and rotatably disposed in the other of said passages in said body to provide communication between another portion of the interior of said body and the other of the passages in the member, said first means including a first member slidably disposed in said one passage in said body and a second member rotatably and slidably mounted on said first member, said second member being mounted on said first member for movement with said first member when said first member slides within said one passage in said body, said first member being rotatable within said one passage in said body about a first axis, said second member being mounted on said first member for rotation with said first member during rotation of said first member about the first axis, and said second member being rotatable on said first member about a second axis parallel to the first axis but offset therefrom to enable alignment of said second member with the one passage in the member while said second means is aligned with the other passage in the member.

19. The body according to claim 18 including first locking means to lock said first member of said first means against rotation about the first axis and second locking means to lock said second means against rotation.

20. The swivel connector according to claim 2 in which said hollow tubular member includes a first portion having its longitudinal axis aligned with the first axis and a second portion having its longitudinal axis aligned with the second axis.

21. The swivel connector according to claim 2 in which the one end of said hollow tubular member has its center aligned with said first axis and the other end of said hollow tubular member has its center aligned with said second axis.

22. The swivel connector according to claim 2 in which said first member includes means spaced from said means rotatably connecting said first and second members in a direction away from said second member to support said one end of said hollow tubular member and said third member includes means spaced from said means rotatably connecting said second and third members in a direction away from said second member to support the other end of said hollow tubular member.

23. The swivel connector according to claim 3 including first locking means to lock said first means of said first member against axial and rotational motion relative to said body and second locking means to lock said second member against axial and rotational motion relative to said body.

24. The swivel connector according to claim 7 in which said balls of said means rotatably connecting said first and second members includes a plurality of balls of plastic and a plurality of metal balls, said plastic balls being greater in number than said metal balls, and said metal balls being of a slightly smaller diameter than said plastic balls so as to not create wear on said first member or said second member; and said balls of said means rotatably connecting said second and third members includes a plurality of balls of plastic and a plurality of metal balls, said plastic balls being greater in number than said metal balls, and said metal balls being of a slightly smaller diameter than said plastic balls so as to not create wear on said second member or said third member.

25. The swivel connector according to claim 16 in which said balls of said means rotatably connecting said first and second members includes a plurality of balls of plastic and a plurality of metal balls, said plastic balls being greater in number than said metal balls, and said metal balls being of a slightly smaller diameter than said plastic balls so as to not create wear on said first member on said second member; and said balls of said means rotatably connecting said second and third members includes a plurality of balls of plastic and a plurality of metal balls, said plastic balls being greater in number then said metal balls, and said metal balls being of a slightly smaller diameter than said plastic balls so as to not create wear on said second member or said third member.

26. The swivel connector according to claim 9 in which said connecting means includes means to lock said first tubular member against longitudinal and rotational motion relative to said first member.

27. The swivel connector according to claim 12 in which said connecting means includes means to lock said first tubular member against longitudinal and rotational motion relative to said first member.

28. The swivel connector according to claim 11 in which said first member has said first and second passages disposed therein with the first axis passing between said first and second passages so that each of said first passage and said second passage is rotatable about the first axis when the relative rotation between said first and second members.

* * * * *